Figure 5:
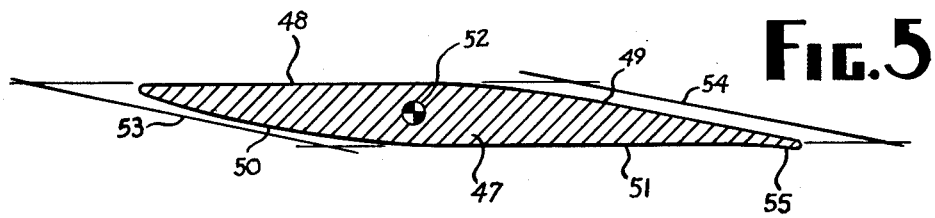

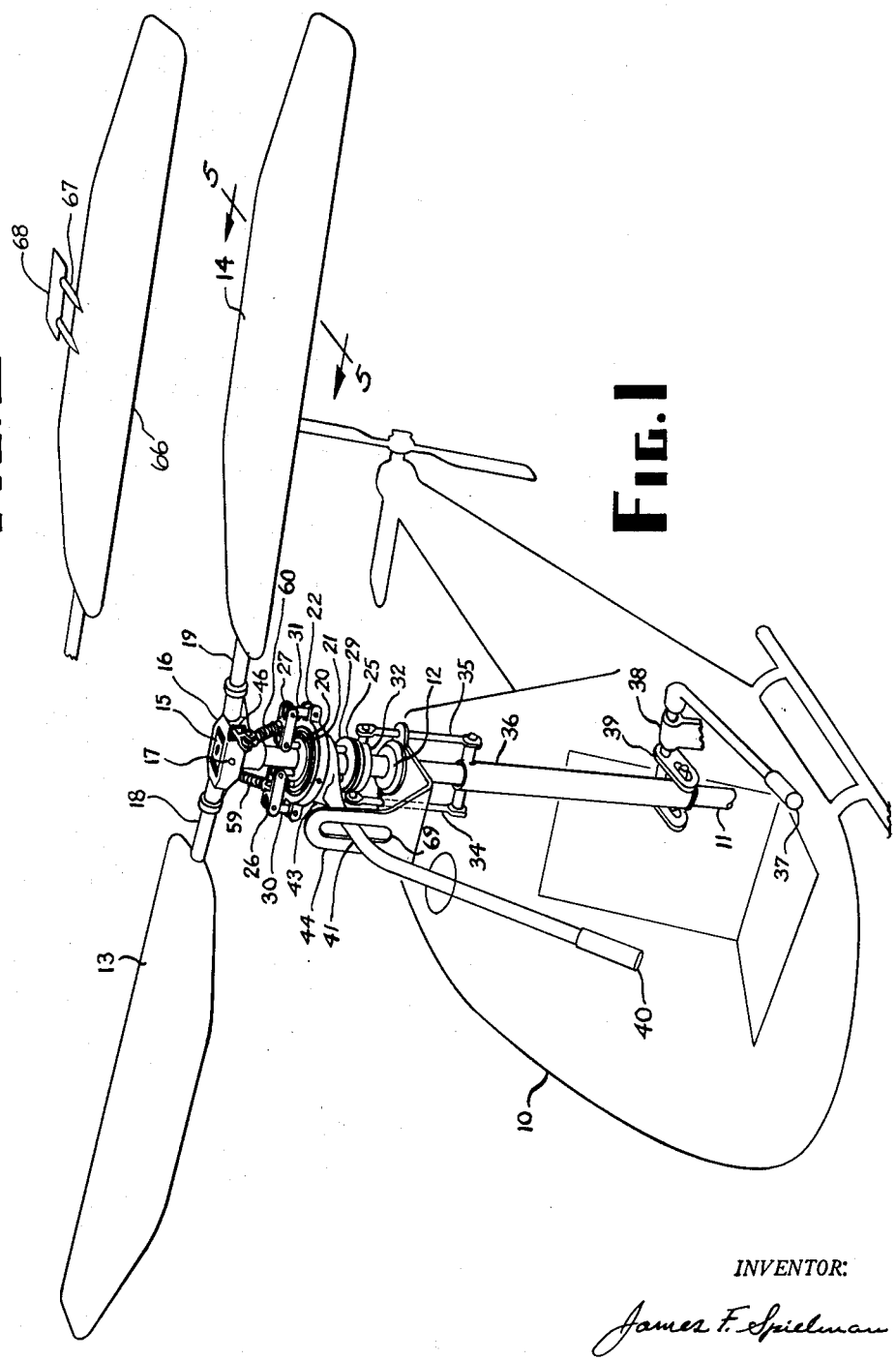

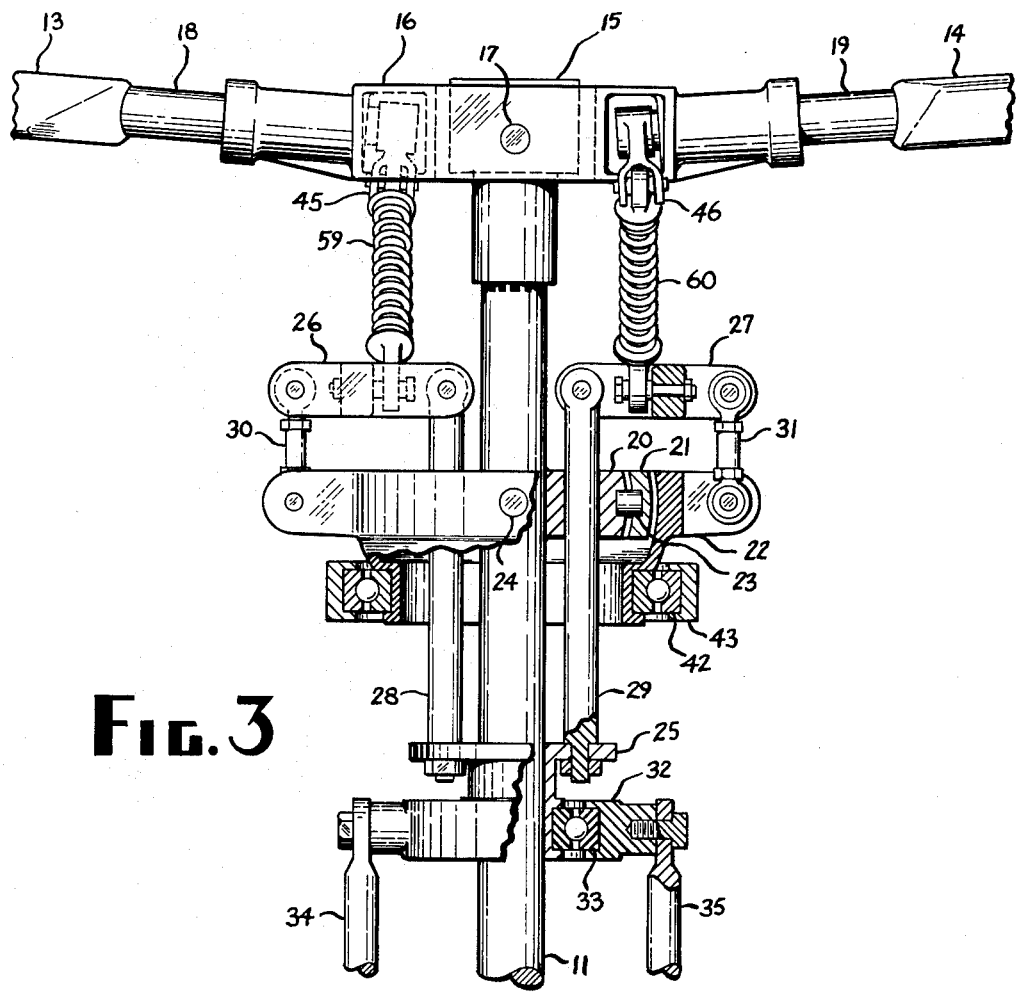

Sept. 21, 1965   J. F. SPIELMAN   3,207,228
HELICOPTER ROTORS AND CONTROLS
Filed Oct. 30, 1962   3 Sheets-Sheet 3

INVENTOR:
James F. Spielman

United States Patent Office

3,207,228
Patented Sept. 21, 1965

3,207,228
HELICOPTER ROTORS AND CONTROLS
James F. Spielman, North Road, Bantam, Conn.
Filed Oct. 30, 1962, Ser. No. 234,187
3 Claims. (Cl. 170—160.26)

The invention relates to advancements in the art of designing rotor blades for helicopters or other vertical take-off aircraft when the rotor blades have wide chords relative to their lengths, and especially relates to the design of the airfoil cross-section.

The rotors of helicopters presently being made are all being designed around a single science depending upon a certain mechanical-aerodynamic end result which in itself limits the helicopter to boundaries in load-carrying efficiency. Helicopter science at this time relies on the use of rotor blades of long slender construction and having a narrow chord in relation to their span. In flight the wings always have a significant positive angle of incidence, very acute for climbing and less acute for maintaining a level of flight. The rotor blades "mush" through the air in a manner in which thrust is applied to lift the aircraft.

Many advantages are to be gained when rotor wings having wide chords or large lifting areas can be put on the lifting rotors of helicopters without sacrificing good control performance. Most important among these advantages are improved load capacity because of high solidity in the rotor disc, low drag and low pitching movement of the rotor blades during their rotative cycle. Low drag at high lift as well as at moderate lifts, and small pitching movement are desirable characteristics in a rotor wing, achieved to a greater degree as the rotor wing chord width is increased. In helicopters designed within the known science there are definite limitations on how wide a rotor wing can be made because of important considerations among which are over-control, ground effect and rotor blade stall. This invention will reveal how helicopter flight can be accomplished through forces more akin to lift than to thrust in a new concept where the old science of helicopter design will not in all phases apply. A new avenue of flight will be seen in provision for real wing lift in a helicopter.

To achieve flight in a rotary wing aircraft there must be a constant influx of air through the rotor from above. Helicopters presently being made have airfoils whose cross-section has an excessive convexity on the top surface forward of the pitching axis or whose cross-section is symmetrical in camber about a direct line between the leading and trailing edges. Convexity on top of the leading edge is satisfactory in the present science because the rotor blades pitch excessively to create enough angle of attack to produce and maintain flight. A broad rotor blade or wing does not have to pitch excessively to produce flight because of large support area or disc solidity. Low pitching moment then calls for a new airfoil cross-sectional design since known airfoil shapes present both the upper leading surface and the lower leading surface of the leading edge to the air, causing a swirling of air centrifugally over the upper and lower surfaces of the wing without providing appreciable lift until the angle of attack is excessive for a wide wing. Unless a normal positive angle of attack is provided on the lower leading surface of the rotor blade or wing, and substantial parallelism, as will later be described, exists between the main mean plane of the upper leading surface and the main mean plane of the lower trailing surface, the cut of the wing through the air will not cause air influx into the rotor from above.

The invention hereinafter described will advance the new science of vertical flight first introduced in my previous Patent No. 3,006,418. Fundamental airfoil cross-section characteristics necessary for a wide chord rotor blade to perform satisfactorily will be disclosed. Although rotor wings having wide chords may be constructed in many different shapes in plan or perimeter form, there are certain airfoil cross-section characteristics without which such rotor wings cannot effectively provide vertical flight. This improvement will further disclose separate invention in two mechanical concepts incorporating resiliency into rotor blade pitch control.

The primary object of the invention is to furnish an airfoil cross-section suitable for rotor blades of vertical take-off aircraft as the chord width, relative to the length of the rotor blade, increases as the state of helicopter art advances.

Another object of the invention is to provide for resiliency in the rotor blade pitch controls of a helicopter using rotor blades with wide chords.

Figure 6:
Figure 7:
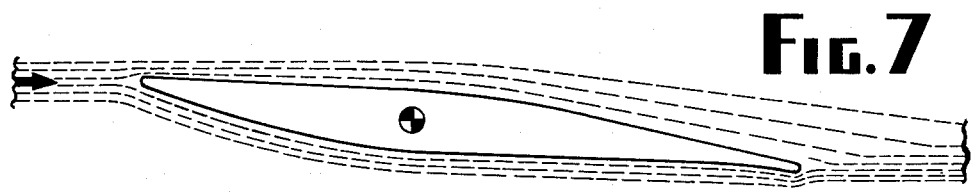

In the drawings: FIG. 1 is a perspective illustration of control elements in a helicopter; FIG. 2 is a perspective view of a rotor wing variation; FIG. 3 is a cross-sectional and cut-away drawing of mechanism in the helicopter shown in FIG. 1, viewed from the front; FIG. 4 is a drawing of a compression resilient link unit, illustrative of means for controlling rotor blade pitch by pressure rather than by a fixed mechanical connection with pilot controls; FIG. 5 is an illustration of a parallelogrammical airfoil cross-section depicting the fundamental shapes and contours necessary to describe the primary invention, taken along line 5—5 of FIG. 1; FIGS. 6 and 7 illustrate aerodynamic reaction and effect on the airfoil cross-section shown in FIG. 5; and FIG. 8, with reference to FIG. 2, schematically illustrates some variations that may be made while combining a parallelogrammical airfoil with a second helicopter resilient control mechanism.

A helicopter fuselage 10, and other parts not directly related to the invention, is outlined in FIG. 1. The helicopter fuselage 10 contains a collective pitch control mechanism and a cyclic pitch control mechanism which will presently be described with reference especially to FIGS. 1, 3 and 4 of the drawings.

On the helicopter a source of power such as an engine may drive a vertically disposed rotor drive shaft 11 in a clockwise direction as viewed from above in FIG. 1. The drive shaft 11 is carried toward the top thereof by a bearing 12 for alignment. Rotative motion of the drive shaft 11 is carried to a pair of rotor blades or wings 13 and 14 by way of a hub core 15 fixed on the drive shaft 11, a hub 16, a connecting pin 17 and a pair of diametrically disposed rotor shafts 18 and 19. The rotor shafts 18 and 19 are fixed with the rotor wings 13 and 14 respectively, and are pivotable or rotatable in the hub 16 about lineal axes or pitching axes (see 52, FIG. 5). A pair of bellcranks 45 and 46 are fixed to the inner ends of the rotor shafts 18 and 19 respectively, thereby to rotate therewith.

It is now established that the rotor wings 13 and 14 can rotate or change angle of incidence by virtue of the capability of the rotor shafts 18 and 19 to rotate within the hub 16; and it has been established that the rotor wings 13 and 14 can be rotated by power in an essentially horizontal plane about a vertical axis running lineally through the drive shaft 11.

Attached to the drive shaft 11 near the top is a common universal or gimbal system comprised first of an inner collar 20, an intermediate ring 21 and an outer housing 22. The inner collar 20 is non-slidably and non-rotatably fixed to the drive shaft 11. The intermediate ring 21 is pivotably fastened to the inner collar 20 by a pair of diametrically opposite pins, 23 being an example. The outer housing 22 is pivotably fastened to the intermediate ring 21 by a pair of diametrically opposite pins, 24 being an example, in a position perpendicular to the pins, 23 being an example, but with axes in the same plane. Thus the gimbal system can tilt or incline freely in any direction about a centerpoint in the drive shaft 11.

A flanged sleeve 25 is slidable along the drive shaft 11, but fixed in rotation therewith. A pair of floating or free links 26 and 27 on opposite sides of the drive shaft 11 are pivotably connected to the upper ends of a pair of vertically disposed actuating rods 28 and 29 respectively which are fixedly attached at their lower ends to the flanged sleeve 25 and are slidable through the inner collar 20 of the gimbal system. A pair of vertically disposed cyclic links 30 and 31 are pivotable at their upper ends to the free links 26 and 27 respectively, and are universally pivotable within a range at their lower ends by a ball connection to opposite sides of the outer housing 22 of the gimbal system to accommodate tilting of the gimbal system.

An actuating flange 32 is rotatable relative to the flanged sleeve 25 by means of a ball bearing 33 which also prevents lineal translation of the actuating flange 32 relative to the flanged sleeve 25. A pair of vertically disposed push rods 34 and 35 connect the actuating flange 32 with a control sleeve 36 (FIG. 1) which passes around the drive shaft 11. The control sleeve 36 can slide vertically with respect to the drive shaft 11, but does not rotate therewith.

A collective pitch control handle 37 (FIG. 1), carried pivotably in a fuselage based bracket 38, can be moved up or down to operate a bellcrank 39 to impart vertical movement as desired to the control sleeve 36, push rods 34 and 35, actuating flange 32, flanged sleeve 25 and actuating rods 28 and 29.

A cyclic pitch control handle 40 (FIG. 1) has a portion or root shaft 41 which aligns axially with the previously described plane of tilting of the gimbal system. The root shaft 41 engages with the outer housing 22 of the gimbal system by way of a ball bearing 42 and a housing 43 which is integral with the root shaft 41. Thus the outer housing 22 of the gimbal system can rotate with respect to the housing 43 but cannot slide in relation to the same. The root shaft 41 is also carried in a vertical slot 69 in a bracket 44 (FIG. 1) based on the fuselage 10. Motion imparted to the cyclic pitch control handle 40 by a pilot to rotate the root shaft 41 will effect tilting of the gimbal system to the side, where forward and aft motion of the cyclic pitch control handle 40 will effect tilting of the gimbal system to the rear or to the front. Combining of motions allows a pilot to tilt the gimbal system in any direction desired and to any amount desired within a limited range.

The foregoing establishes that all of the parts seen in FIG. 3 rotate with the drive shaft 11 about a vertical axis with the exception of the housing 43, the actuating flange 32, the actuating rods 34 and 35, and the outer races of the ball bearings 33 and 42. A pilot of the helicopter can perform all of the above-described mechanical movements by operating the collective pitch control handle 37 and the cyclic pitch control handle 40 while this joint rotative movement about the vertical axis of the drive shaft 11 is taking place.

The elements thus far described are conventional in plan; and the same or equivalent may be found on helicopters now in use. These exemplary elements are described with the object of presenting mechanism to substantiate th eoperation and function of the invention now to be delineated.

A compression resilient link unit may be defined as a member which will shorten under compressive pressure with increasing resistance to the compressive pressure as substantiate the operation and function of the invention tion of a compression resilient link unit in the form of a compression spring 56, an inner sliding shaft element 57 and an outer sliding sleeve element 58. A pair of compression resilient link units 59 and 60 are pivotably connected at their upper ends to the bellcranks 45 and 46 respectively, and are attached at their lower ends to an intermediate point of the free links 26 and 27 respectively by a limited universally pivoting ball connection. Upward movement of the actuating rods 28 and 29 as hereinbefore described will cause the free links 26 and 27 to move vertically (FIG. 3) at their inward ends while pivoting on the upper ends of the cyclic links 30 and 31 respectively at their outer ends. This movement will cause upward movement of the lower connections of the compression resilient link units 59 and 60.

At this point of pitch control the function of a new invention begins to take place. In known helicopters the link units 59 and 60 are not resilient, and thus upward movement of the collective pitch control handle has the result of increasing the pitch of the rotor blades directly; and operation of the cyclic pitch control handle causes the pitch of the rotor blades directly to increase progressively as the rotor blades approach the high side of the incline of the tilted gimbal system and cause the pitch of the rotor blades to directly decrease progressively as the rotor blades approach the low side of the incline of the tilted gimbal system, for directional and compensating control. These functions are by direct connection to pilot control in the conventional helicopter because rotor blades with narrow chords require positive rotor blade pitch control.

At this point the function of what will be called a parallelogrammical airfoil cross-section will be explained.

The parallelogrammical airfoil or wing concept is based on the discovery that the upper surface forward of the pitching axis must be substantially flat or not appreciably convex for a rotor wing with a wide chord to provide vertical flight. Other surfaces of the wing may have various cambers depending upon vertical thickness, width of wing and percentage of wing chord width aft of the pitching axis. However there are certain characteristics which will distinguish a parallelogrammical airfoil cross-section from known airfoil cross-sections. It will first be a characteristic that the upper surface of the wing beginning at the radius forming the leading edge will be substantially flat for a significant distance aft toward the trailing edge. It will secondly be a characteristic that the main mean plane of the lower surface of the wing aft of the pitching axis will be substantially parallel with the main mean plane of the upper forward surface of the wing. "Parallelism" between the upper forward surface and the lower aft surface as described will be understood to mean approximate parallelism between mean or chordal lines related to any minor camber or contour that the said surfaces may have between the pitching axis and their respective wing edges where continuation of the mean or chordal lines will result in parallelism thereof or convergence thereof at a point aft of the trailing edge of the wing. Absolute parallelism in this sense is then understood as being a condition where the angle of convergence of the mean plane of the upper forward surface related to the mean plane of the lower aft surface in the direction of the trailing edge is zero degrees. Convergence of these surfaces in the direction of the trailing edge assures that air will influx through the rotor wings from above before the lower aft surface reaches a lifting attitude or positive angle of incidence in relation to the line of advance; and this relationship further assures that the upper forward surface will not be hurling air centrifugally when the wing reaches a general lifting angle as exemplified in FIG. 7.

It is recognized then that a parallelogrammical airfoil cross-section will have a generally flat upper surface forward of the pitching axis and a generally flat lower surface aft of the pitching axis, and that the mean planes of these surfaces will be convergent toward the trailing edge of the wing, or conversely, will be divergent toward the leading edge of the wing. Flatness on the upper leading surface and parallelism as described above between the upper leading surface and the lower trailing surface are characteristics manifest in no other but a parallelogrammical airfoil cross-section. A third characteristic logically follows that there will be an obtuse angle between the lower leading surface and the lower trailing surface; and that there will be an obtuse angle between the upper leading surface and the upper trailing surface for an airfoil to be called "parallelogrammical."

A parallelogrammical airfoil cross-section 47, which may hereinafter be referred to as "the wing," is illustrated in FIG. 5, where an upper leading surface 48 is shown substantially parallel to a lower trailing surface 51. Completing a parallelogrammical shape are a lower leading surface 50 and an upper trailing surface 49. A mean or chordal line 53 drawn forward and outside of the airfoil 47 and a mean or chordal line 54 drawn aft and outside of the airfoil 47 illustrate a basic parallelogrammical shape. It will be noted that the height or thickness of such a wing can vary to any amount while retaining the same plan shape. A pitching axis 52 is indicated.

Referring now also to FIGS. 6 and 7, air (dotted lines) is shown flowing at high speed over the wing from the leading edge. The wing may have a downward trailing edge angle 55 arranged to deflect the trailing edge of the wing upward, assisting a lowered pressure on the upper trailing surface 49 of the wing due to air passing over at high speed. These aerodynamic forces, added to the natural tendency of the trailing edge to remain aft by virtue of its distance from the pitching axis 52 being greater than the distance of the leading edge from the pitching axis 52, will more than counteract air impact forces on the lower leading surface of the wing and will result in an attitude represented in FIG. 6 in a case where no control forces are applied by pilot.

It is understood that the airfoil 47 or the wing is of wide chord and that low pitching will be required to create lift.

A pilot may move the collective pitch control handle 37 slightly upward to thereby cause upward movement of the lower connections of the compression resilient link units 59 and 60, as already described. Direct increase of the angle of incidence of the rotor wings 13 and 14 will not necessarily result because the springs, 56 being an example, will compress from restraining aerodynamic force on the trailing section of the wing transferred through the bell cranks 45 and 46. Upon further movement of the collective pitch control handle 37, the springs, 56 being an example, may be compressed to a degree where pressure may cause the wing to assume a position as illustrated in FIG. 7. Lift is applied to the wing in FIG. 7 because impact air is striking the entire lower surface of the wing and a lowered air pressure is being applied to the entire upper surface of the wing due to air passing over at high speed. Aerodynamic forces on the trailing portion of the wing are then in balance with tension in the springs, 56 being an example, and with aerodynamic force on the lower leading surface 50. Once the wing has assumed an attitude to cause lift for a given aircraft, only minute changes in angle of incidence will cause further ascent, hovering or descent.

It is a significant point of invention that the wing as in FIG. 7 will drive air downward and cause an influx of air from above without excessive angle of incidence of the wing as a whole. Although it may be said that the lower leading edge 50 of the wing constitutes a positive angle of incidence, it will be remembered that the span of the wing on a given aircraft may be short enough to require lift to some degree on the remaining wing area to achieve flight.

When the cyclic pitch control handle 40 is operated, pressure toward changing angle of incidence will vary on each of the rotor wings 13 and 14 according to the tilt of the gimbal system and its mechanical connection to the free links 26 and 27 by the cyclic links 30 and 31. This will cause more lift to be created on one side of the rotative cycle of the rotor wings 13 and 14 for directional and compensating control without appreciable change in angle of incidence.

It has been illustrated and described how a pilot of a helicopter or the like using rotor wings having wide chords and parallelogrammical airfoils can control the helicopter, especially when the control movements to change the angle of incidence of the rotor wings are not carried directly, but are transmitted through a resilient means which applies actuating pressure. No tilting system of the plane of the turning rotor about the vertical axis of the drive shaft is depended upon for function of the invention; and such description would be superfluous.

Figure 8:
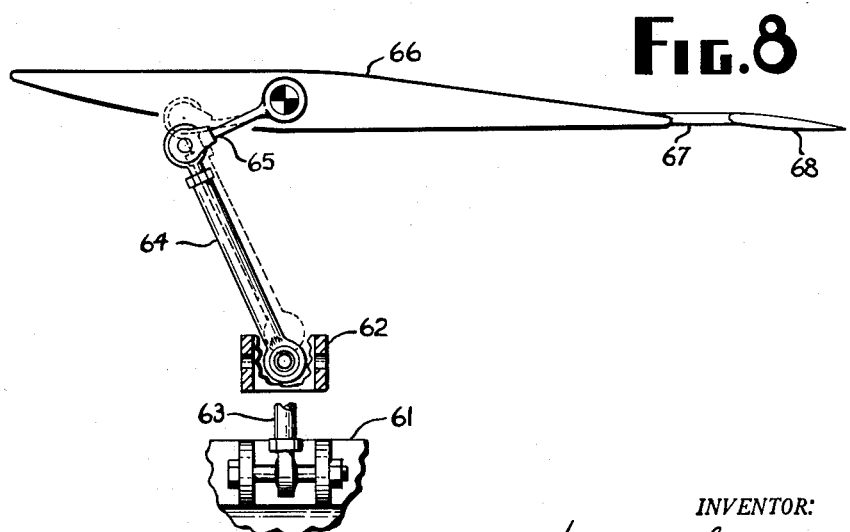

FIGS. 2 and 8 show a parallelogrammical wing 66 having two rods, 67 being an example, attaching a ground fixed and trailing stabilizing wing or tab 68. The tab 68 may be added to the wing 66 in certain designs in order to maintain a desired trailing attitude in the event that other design considerations result in a cross-section that will not respond properly.

FIG. 8 further schematically illustrates a fragment of an outer housing 61, similar to the outer housing 22, of a gimbal system which may operate a cyclic link 63 and a free link 62. The free link 62 may operate a link 64 which is not resilient to pressure, but which in turn may operate a bellcrank 65 to adjust the pitch of the rotor wing 66. The bellcrank 65 is resilient to pressure in that it can bend in the portion between its ends to an increasing amount as the link 64 exerts more pressure (dotted lines. The end function of this mechanism variation is then the same as that accomplished by the compression resilient link units 59 and 60.

The foregoing has brought forth a new discovery in helicopter rotor wing airfoil shapes. Such a shape permits influx of air from above through the turning rotor wings while the mean angle of incidence of the rotor wings is not appreciably acute. Although the shape may not represent a true parallelogram, the term "parallelogrammical" has been used to convey a shape impression. The new airfoil shape is especially suitable for rotor wings which have wide chords or large lifting areas and which therefore require little movement in pitch change. In separate invention the foregoing has also revealed how resilient means may be applied to control rotor wings having wide chords or large lifting areas and which require little movement in pitch change. Resilient means in the pitch-changing controls produces aerodynamic sensing of wide chord rotor wings to pitch control, rather than appreciable movement now known in conventional helicopters using direct pitch control. The term "helicopter" is herein recognized as meaning any type of rotary wing aircraft. Departures other than those illustrated may be made in constructing helicopters within the spirit and scope of the invention as defined in the following claims.

I claim:

1. A rotary wing aircraft, said aircraft comprising; a source of power, a vertically disposed rotor drive shaft driven by the said source of power about a vertical axis, a plurality of horizontally disposed rotor wings on the said rotor drive shaft and rotating therewith about the said vertical axis, said rotor wings being pivotable relative to the said rotor drive shaft about substantially horizontal axes whereabout the angles of incidence of the said rotor wings may be adjusted, said rotor wings having leading sides and trailing sides relative to the said horizontal axes, said leading sides leading in the direction of rotation, said rotor wings having upper surfaces on the said leading sides relative to the said horizontal axes, said rotor wings having lower surfaces on the said trailing sides relative to the said horizontal axes, said upper surfaces being disposed in respective mean planes, said lower surfaces being disposed in respective mean planes, said mean planes respective to the said upper surfaces and said mean planes respective to the said lower surfaces being divergent chordwise relative to each other toward the said leading sides of the said rotor wings as related to the said horizontal axes, and control elements in the aircraft connected with the said rotor wings for pilot operation to adjust the angles of incidence of the said rotor wings about the said horizontal axes thereof.

2. A rotary wing aircraft, said aircraft comprising: a source of power, a vertically disposed rotor drive shaft driven by the said source of power about a vertical axis, a plurality of horizontally disposed rotor wings on the said rotor drive shaft and rotating therewith about the said vertical axis, said rotor wings being pivotable relative to the said rotor drive shaft about substantially horizontal axes whereabout the angles of incidence of the said rotor wings may be adjusted, said rotor wings having leading sides and trailing sides relative to the said horizontal axes, said leading sides leading in the direction of rotation, said rotor wings having upper surfaces on the said leading sides relative to the said horizontal axes, said rotor wings having lower surfaces on the said trailing sides relative to the said horizontal axes, said upper surfaces being disposed in respective mean planes, said lower surfaces being disposed in respective mean planes, said mean planes respective to the said upper surfaces and said mean planes respective to the said lower surfaces being divergent chordwise relative to each other toward the said leading sides of the said rotor wings as related to the said horizontal axes, controls in the aircraft connected with the said rotor wings for pilot operation to adjust the angles of incidence of the said rotor wings about the said horizontal axes thereof, and resilient means in the said controls through which forces exerted by a pilot of the aircraft oppose aerodynamic lifting forces acting upon the said rotor wings.

3. A rotary wing aircraft, said aircraft comprising: a hub, said hub being rotatable about a substantially vertical axis, a plurality of horizontally disposed rotor wings on the said hub, said rotor wings being pivotable relative to the said hub about substantially horizontal axes whereabout the angles of incidence of the said rotor wings may be adjusted, said rotor wings having leading sides and trailing sides relative to the said horizontal axes, said leading sides leading in the direction of rotation when the said rotor wings rotate with the said hub, said rotor wings having upper surfaces on the said leading sides relative to the said horizontal axes, said rotor wings having lower surfaces on the said trailing sides relative to the said horizontal axes, said upper surfaces being disposed in respective mean planes, said lower surfaces being disposed in respective mean planes, said mean planes respective to the said upper surfaces and said mean planes respective to the said lower surfaces being divergent chordwise relative to each other toward the said leading sides of the said rotor wings as related to the said horizontal axes, a source of power for rotating the said rotor wings in a substantially horizontal plane with the said hub about the said vertical axis thereof, and control elements in the aircraft connected with the said rotor wings for pilot operation to adjust the angles of incidence of the said rotor wings about the said horizontal axes thereof.

References Cited by the Examiner

UNITED STATES PATENTS

| | | | |
|---|---|---|---|
| 978,677 | 12/10 | Taylor | 170—159 |
| 1,068,946 | 7/13 | Taylor | 170—159 |
| 2,519,762 | 8/50 | Hoffmann | 170—160.25 |
| 2,677,430 | 5/54 | Prince | 170—160.25 |
| 2,735,500 | 2/56 | Perry | 170—160.25 |
| 2,829,721 | 4/58 | Gebhard | 170—135.26 |
| 3,080,001 | 3/63 | Culver et al. | 170—160.13 |
| 3,135,334 | 6/64 | Culver | 170—160.13 |

FOREIGN PATENTS

| | | |
|---|---|---|
| 1,172,254 | 10/58 | France. |
| 368,721 | 2/23 | Germany. |

JULIUS E. WEST, *Primary Examiner.*

ABRAM BLUM, *Examiner.*